United States Patent
Honda et al.

(10) Patent No.: US 10,801,085 B2
(45) Date of Patent: Oct. 13, 2020

(54) HIGH-STRENGTH STEEL SHEET AND METHOD FOR MANUFACTURING THE SAME

(71) Applicant: JFE STEEL CORPORATION, Tokyo (JP)

(72) Inventors: Yuma Honda, Fukuyama (JP); Yoshimasa Funakawa, Chiba (JP); Kozo Harada, Bekasi (ID)

(73) Assignee: JFE STEEL CORPORATION, Tokyo (JP)

( * ) Notice: Subject to any disclaimer, the term of this patent is extended or adjusted under 35 U.S.C. 154(b) by 247 days.

(21) Appl. No.: 15/577,989

(22) PCT Filed: May 26, 2016

(86) PCT No.: PCT/JP2016/002535
§ 371 (c)(1),
(2) Date: Nov. 29, 2017

(87) PCT Pub. No.: WO2016/194342
PCT Pub. Date: Dec. 8, 2016

(65) Prior Publication Data
US 2018/0291476 A1 Oct. 11, 2018

(30) Foreign Application Priority Data
May 29, 2015 (JP) .................................. 2015-109522

(51) Int. Cl.
*C21D 6/00* (2006.01)
*C21D 8/04* (2006.01)
(Continued)

(52) U.S. Cl.
CPC ............... *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 1/76* (2013.01); *C21D 6/004* (2013.01); *C21D 6/005* (2013.01); *C21D 6/008* (2013.01); *C21D 8/0405* (2013.01); *C21D 8/0426* (2013.01); *C21D 8/0436* (2013.01); *C21D 8/0478* (2013.01); *C21D 9/48* (2013.01); *C21D 9/561* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/105* (2013.01); *C22C 38/12* (2013.01); *C22C 38/16* (2013.01); *C22C 38/18* (2013.01); *C22C 38/20* (2013.01); *C22C 38/26* (2013.01); *C22C 38/32* (2013.01); *C22C 38/40* (2013.01); *C22C 38/42* (2013.01); *C22C 38/44* (2013.01); *C22C 38/48* (2013.01);
(Continued)

(58) Field of Classification Search
CPC ...... C21D 2211/005; C21D 1/26; C21D 1/74; C21D 8/0405; C21D 8/0478; C21D 8/0436; C21D 8/0426; C21D 9/48; C21D 9/46; C21D 6/005; C21D 6/008; C21D 6/004; C21D 9/561; C21D 1/76; C25D 3/22; C25D 5/36; C22C 38/06; C22C 38/002; C22C 38/04; C22C 38/12; C22C 38/001; C22C 38/48; C22C 38/16; C22C 38/02; C22C 38/54; C22C 38/08; C22C 38/105; C22C 38/18; C22C 38/20; C22C 38/26; C22C 38/32; C22C 38/40; C22C 38/42; C22C 38/44; C23C 2/06; C23C 2/40; C23C 2/28; C23C 2/02; C23C 2/04; C23C 2/26; C23C 2/36; C23C 28/021; C23C 28/023; C23C 28/025; C23C 30/00; C23C 30/005; B32B 15/01; B32B 15/013; B32B 15/04; B32B 15/043; B32B 15/18; Y10T 428/12792; Y10T 428/12951; Y10T 428/12958; Y10T 428/12965; Y10T 428/12972
See application file for complete search history.

(56) References Cited

U.S. PATENT DOCUMENTS

| | | | | |
|---|---|---|---|---|
| 2006/0113012 A1* | 6/2006 | Okamoto | ................ | C22C 38/02 148/602 |
| 2011/0186185 A1* | 8/2011 | Nonaka | ................... | C22C 38/02 148/504 |
| 2014/0366994 A1* | 12/2014 | Kizu | ........................ | C21D 9/46 148/507 |

FOREIGN PATENT DOCUMENTS

CN 101583740 A 11/2009
CN 102482728 A 5/2012
(Continued)

OTHER PUBLICATIONS

Machine Translation, Okamoto Tsutomu, JP 2007-031771 A, Feb. 2007. (Year: 2007).*

(Continued)

*Primary Examiner* — Michael E. La Villa
(74) *Attorney, Agent, or Firm* — Oliff PLC

(57) ABSTRACT

A high-strength steel sheet having high yield ratio, excellent stretch flange formability, and resistance to secondary working embrittlement. The steel sheet has a composition containing C: 0.02% to less than 0.10%, Si: less than 0.3%, Mn: less than 1.0%, P: 0.10% or less, S: 0.020% or less, Al: 0.01% to 0.10%, N: 0.010% or less, and Nb: 0.003% to less than 0.070% on a mass basis, the remainder being Fe and inevitable impurities. A steel microstructure of the steel sheet contains ferrite: 90% or more and a total of pearlite, martensite, retained austenite, and cementite: 0% to 10% on an area fraction basis, in which the average grain size of the ferrite is 15.0 μm or less, and in which the average aspect ratio of the ferrite is 1.2 or more; and a tensile strength of 500 MPa or less.

20 Claims, 1 Drawing Sheet

(51) Int. Cl.

| | |
|---|---|
| C21D 9/46 | (2006.01) |
| C22C 38/54 | (2006.01) |
| C22C 38/48 | (2006.01) |
| C22C 38/16 | (2006.01) |
| C22C 38/06 | (2006.01) |
| C22C 38/04 | (2006.01) |
| C22C 38/02 | (2006.01) |
| C22C 38/00 | (2006.01) |
| C23C 2/28 | (2006.01) |
| C23C 2/40 | (2006.01) |
| B32B 15/01 | (2006.01) |
| C25D 3/22 | (2006.01) |
| C25D 5/36 | (2006.01) |
| C22C 38/12 | (2006.01) |
| C21D 9/48 | (2006.01) |
| C23C 2/06 | (2006.01) |
| C23C 2/02 | (2006.01) |
| C21D 9/56 | (2006.01) |
| C21D 1/76 | (2006.01) |
| C22C 38/32 | (2006.01) |
| C22C 38/10 | (2006.01) |
| C22C 38/26 | (2006.01) |
| C22C 38/18 | (2006.01) |
| C22C 38/42 | (2006.01) |
| C22C 38/44 | (2006.01) |
| C22C 38/40 | (2006.01) |
| C22C 38/08 | (2006.01) |
| C22C 38/20 | (2006.01) |
| C23C 28/02 | (2006.01) |
| C23C 2/36 | (2006.01) |
| C23C 2/04 | (2006.01) |
| C23C 30/00 | (2006.01) |
| C23C 2/26 | (2006.01) |
| B32B 15/04 | (2006.01) |
| B32B 15/18 | (2006.01) |
| C21D 1/74 | (2006.01) |
| C21D 1/26 | (2006.01) |

(52) U.S. Cl.
CPC ............... *C22C 38/54* (2013.01); *C23C 2/02* (2013.01); *C23C 2/04* (2013.01); *C23C 2/06* (2013.01); *C23C 2/26* (2013.01); *C23C 2/28* (2013.01); *C23C 2/36* (2013.01); *C23C 2/40* (2013.01); *C23C 28/021* (2013.01); *C23C 28/023* (2013.01); *C23C 28/025* (2013.01); *C23C 30/00* (2013.01); *C23C 30/005* (2013.01); *C25D 3/22* (2013.01); *C25D 5/36* (2013.01); *C21D 1/26* (2013.01); *C21D 1/74* (2013.01); *C21D 2211/005* (2013.01); *Y10T 428/12792* (2015.01); *Y10T 428/12951* (2015.01); *Y10T 428/12958* (2015.01); *Y10T 428/12965* (2015.01); *Y10T 428/12972* (2015.01)

(56) References Cited

FOREIGN PATENT DOCUMENTS

| | | |
|---|---|---|
| CN | 103469062 A | 12/2013 |
| EP | 2 103 715 A1 | 9/2009 |
| EP | 2 460 897 A1 | 6/2012 |
| JP | S57079161 A | 5/1982 |
| JP | 63-20888 B * | 5/1988 |
| JP | H04350 A | 1/1992 |
| JP | 2007-031771 A | 2/2007 |
| JP | 4367300 B2 | 11/2009 |
| JP | 4634885 B2 | 2/2011 |
| JP | 2012-072465 A | 4/2012 |
| JP | 4995109 B2 | 8/2012 |
| JP | 5037415 B2 | 9/2012 |
| JP | 2013-224476 A | 10/2013 |
| WO | 2013/035848 A1 | 3/2013 |

OTHER PUBLICATIONS

Machine Translation, Okamoto Atsuki, JP 63-20888 B, May 1988. (Year: 1988).*
Machine Translation, Taro, JP 2013-224476, Oct. 2013. (Year: 2013).*
Feb. 11, 2019 Office Action issued in European Application No. 16 802 784.5.
Jan. 9, 2019 Office Action issued in Korean Patent Application No. 10-2017-7034224.
Oct. 9, 2018 Office Action issued in Chinese Application No. 201680031531.4.
Apr. 24, 2019 Office Action issued in Korean Application No. 10-2017-7034224.
Soon Kyung Kim et al, "A Study on the Annealing Characteristics of BAF for Cold Annealing Characteristics of BAF for Cold Rolled Steel Strip", KSME International Journal, vol. 12, No. 2, Mar. 1, 1998, pp. 330-337.
Feb. 21, 2018 Extended European Search Report in European Patent Application No. 16802784.5.

* cited by examiner

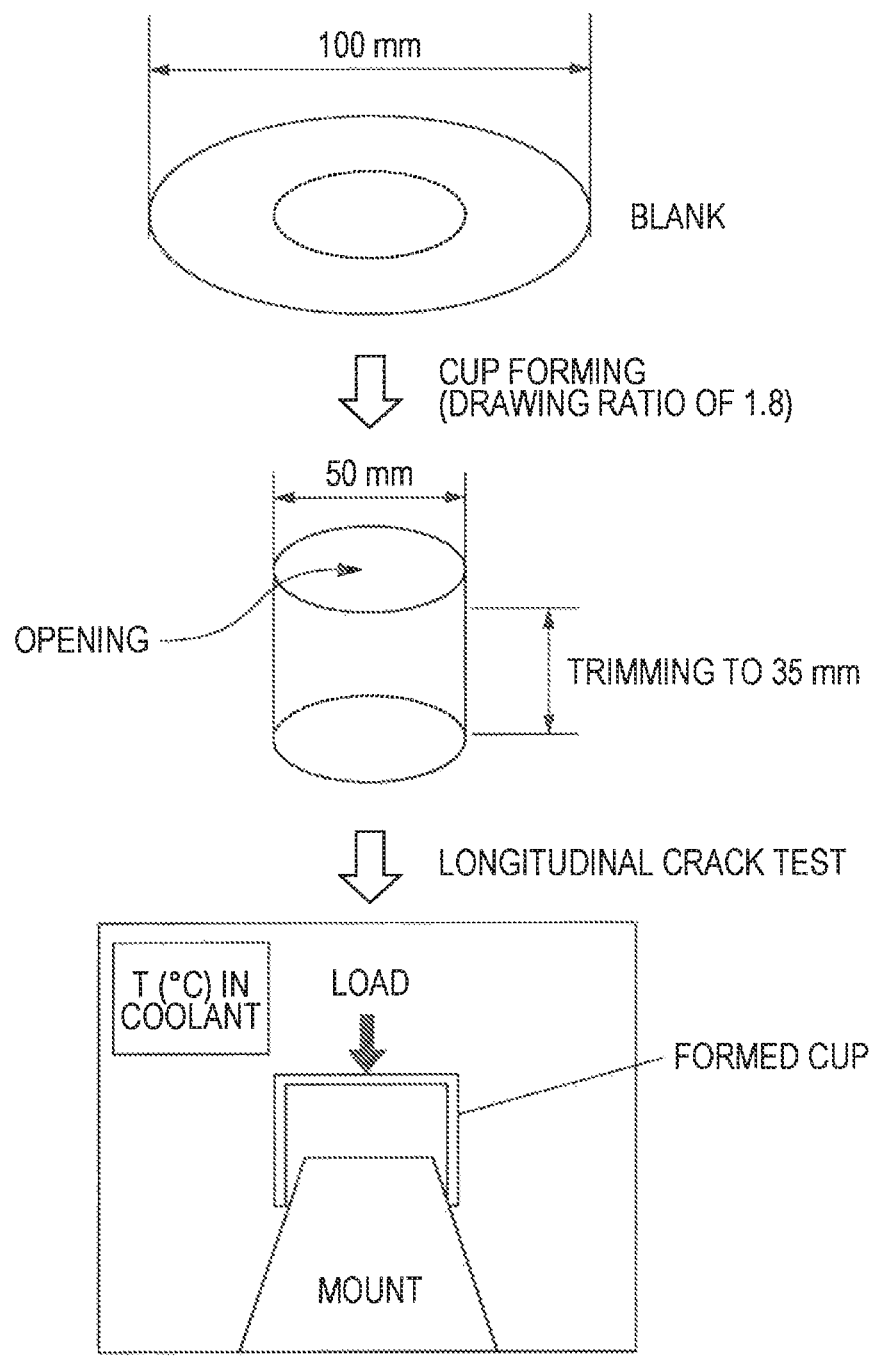

HIGH-STRENGTH STEEL SHEET AND METHOD FOR MANUFACTURING THE SAME

TECHNICAL FIELD

The present disclosure relates to a high-strength steel sheet for use in automotive parts or the like and a method for manufacturing the same.

BACKGROUND ART

In automobiles, steel sheets with a tensile strength of 400 MPa class are still often used while steel sheets with a tensile strength of 590 MPa or more are increasingly used.

The steel sheets with a tensile strength of 400 MPa class are worked into a complicated shape when being formed into automotive parts and therefore are required to have excellent stretch flange formability. In this strength class, the tensile strength and the stretch flange formability contradict each other; hence, the tensile strength is preferably 500 MPa or less in order to achieve excellent formability. However, from the viewpoint of ensuring the strength of parts, the yield strength is preferably high. In particular, the yield ratio, that is, the ratio of the yield strength to the tensile strength is preferably 0.7 or more. Furthermore, in automotive parts, excellent chemical conversion treatability is necessary because a chemical conversion treatment is performed prior to painting such that a phosphate is deposited on a surface of a steel sheet. For such requirements, various steel sheets and techniques for manufacturing the same have been disclosed.

Patent Literature 1 discloses a high Young's modulus steel sheet in which Nb and Ti are added such that the amount of Ti exceeds that of N in terms of atomic ratio, in which the total area fraction of one or both of polygonal ferrite and bainite that are primary phases is 98% or more, and which is excellent in hole expandability and also discloses a method for manufacturing the same.

Patent Literature 2 discloses a high-strength steel sheet in which 0.04% by mass or more of one or both of Nb and Ti are added in total, which contains 20% to 50% of unrecrystallized ferrite as a steel microstructure on an area fraction basis, and which is excellent in crashworthiness and also discloses a method for manufacturing the same.

Patent Literature 3 discloses a high-strength steel sheet which has a Cr content of 0.3% or more on a mass basis, which contains Cr in an amount necessary to ensure the room-temperature aging resistance calculated from the amount of N in steel, in which ferrite is a primary phase, which has a ferrite grain size of 25 μm or less, and which is excellent in curing performance for paint baking and room-temperature aging resistance, and also discloses a method for manufacturing the same.

CITATION LIST

Patent Literature

PTL 1: Japanese Patent No. 5037415
PTL 2: Japanese Patent No. 4995109
PTL 3: Japanese Unexamined Patent Application Publication No. 2007-31771

SUMMARY

Technical Problem

The use of grain dispersion strengthening by Nb, Ti, and V carbides is effective in obtaining a high-strength steel sheet having high yield ratio and excellent stretch flange formability. However, the high-strength steel sheet is embrittled by the strain accumulated during press forming and has a problem with secondary working embrittlement that cracking occurs during the removal of a press die or the transfer of a molded article.

In a technique described in Patent Literature 1, a hot-rolled steel sheet is not cold-rolled and therefore the average grain size of fine ferrite that is an important requirement in the present disclosure is probably not obtained. Therefore, even if high yield ratio and excellent stretch flange formability are achieved by the addition of Nb and Ti, no high-strength steel sheet having resistance to secondary working embrittlement is obtained.

In a technique described in Patent Literature 2, annealing is performed in a continuous annealing line and therefore the heating rate during heating is therefore not appropriately controlled. The soaking temperature is 800° C. or higher and therefore no high-strength steel sheet having high yield ratio, excellent stretch flange formability, and resistance to secondary working embrittlement is obtained.

In a technique described in Patent Literature 3, substantially 0.4% or more Cr needs to be contained in view of the amount of N contained in commercially produced steel. In order to ensure excellent chemical conversion treatability for such steel, an atmosphere during annealing needs to be controlled such that Cr oxides and the like are not formed on a surface during annealing. However, chemical conversion treatability is not at all taken into account in Patent Literature 3 and large amounts of oxides are probably produced in a surface layer of a steel sheet. Therefore, in Patent Literature 3, no high-strength steel sheet with excellent chemical conversion treatability is obtained. Patent Literature 3 describes a technique for manufacturing a steel sheet in a continuous annealing line and no similar effect is probably obtained by box annealing.

In view of such circumstances, the present disclosure has been made to solve the above problems. It is an object of the present disclosure to obtain a high-strength steel sheet which has high yield ratio and which is excellent in stretch flange formability, resistance to secondary working embrittlement, and chemical conversion treatability.

Box annealing furnaces are more advantageous than continuous annealing furnaces in that facility installation costs are low. It is also an object of the present disclosure to manufacture a high-strength steel sheet having the above excellent properties using a box annealing furnace.

Solution to Problem

In order to solve the above problems, the inventors have performed intensive studies. As a result, the inventors have found that it is important that, in a ferrite-dominated steel microstructure, the average grain size defined by the equivalent circle diameter of ferrite is reduced to a certain level or lower and, in a cross section perpendicular to a rolling width direction (rolling transverse direction), the grain length of ferrite grains in a through-thickness direction is reduced below the grain length thereof in a rolling direction, that is, the aspect ratio is increased. The inventors have found that obtaining a predetermined composition and controlling each of the heating rate and soaking temperature during annealing in an appropriate range are effective in obtaining a desired steel microstructure.

Furthermore, the inventors have found that, in order to ensure excellent chemical conversion treatability intended by the present disclosure, it is important that the concentration of hydrogen in an atmosphere during box annealing is 5% by volume or more.

The exemplary disclosed embodiments have been made on the basis of the above findings.

[1] A high-strength steel sheet excellent in chemical conversion treatability has a composition containing C: 0.02% to less than 0.10%, Si: less than 0.3%, Mn: less than 1.0%, P: 0.10% or less, S: 0.020% or less, Al: 0.01% to 0.10%, N: 0.010% or less, and Nb: 0.003% to less than 0.070% on a mass basis, the remainder being Fe and inevitable impurities; a steel microstructure (i) which contains ferrite: 90% or more and a total of pearlite, martensite, retained austenite and cementite: 0% to 10% on an area fraction basis, (ii) in which the average grain size of the ferrite is 15.0 m or less, and (iii) in which the average aspect ratio of the ferrite is 1.2 or more; and a tensile strength of 500 MPa or less.

[2] The high-strength steel sheet excellent in chemical conversion treatability specified in Item [1] further contains one or more of Cr: less than 0.5%, Mo: 0.3% or less, B: 0.005% or less, Cu: 0.3% or less, and Ni: 0.3% or less on a mass basis.

[3] The high-strength steel sheet excellent in chemical conversion treatability specified in Item [1] or [2] has a galvanized layer on a surface thereof.

[4] In the high-strength steel sheet excellent in chemical conversion treatability specified in Item [3], the galvanized layer is a galvannealed layer.

[5] The high-strength steel sheet excellent in chemical conversion treatability specified in Item [1] or [2] has an electrogalvanized layer on a surface thereof.

[6] A method for manufacturing the high-strength steel sheet excellent in chemical conversion treatability specified in Item [1] or [2] includes annealing a cold-rolled steel sheet in a box annealing furnace. The concentration of hydrogen in the atmosphere in the furnace is 5% to 100% by volume. The cold-rolled steel sheet is heated to 550° C. at 120° C./h or less. The cold-rolled steel sheet is soaked in a temperature range from 550° C. to 750° C.

[7] In the method for manufacturing the high-strength steel sheet excellent in chemical conversion treatability specified in Item [6], after the annealing, galvanizing is performed.

[8] In the method for manufacturing the high-strength steel sheet excellent in chemical conversion treatability specified in Item [7], after the galvanizing is performed, the galvanizing is subjected to an alloying treatment.

[9] In the method for manufacturing the high-strength steel sheet excellent in chemical conversion treatability specified in Item [6], after the annealing, electro-galvanizing is performed.

Advantageous Effects

According to the present disclosure, a steel microstructure intended by the present disclosure is obtained by appropriately controlling the composition, the heating rate during annealing, and the soaking temperature during annealing and therefore a high-strength steel sheet which is suitable for use in automotive members, which has high yield ratio, and which is excellent in stretch flange formability, resistance to secondary working embrittlement, and chemical conversion treatability is obtained.

Using a high-strength steel sheet according to the present disclosure as a material for automotive parts allows for the further reduction in weight of automobiles. The value of using the present disclosure is extremely significant in the automobile and steel industries.

The term "high-strength" refers to a tensile strength of 300 MPa to 500 MPa. The term "high yield ratio" refers to a yield ratio of 0.70 or more. The term "excellent stretch flange formability" refers to a hole expansion ratio of 100% or more. The term "excellent resistance to secondary working embrittlement" refers to a brittle transition temperature of −60° C. or lower. The term "excellent chemical conversion treatability" means that the area fraction of a micro-region (a lack of hiding) free from phosphates is 5% or less.

As described above, the steel sheet according to the present disclosure is formed into excellent automotive parts.

A steel sheet that is a material for automotive parts usually has a thickness of 0.5 mm to 2.0 mm.

BRIEF DESCRIPTION OF DRAWINGS

FIG. 1 is an illustration showing a method for measuring the transition temperature that is an indicator for the secondary working embrittlement of a steel sheet.

DESCRIPTION OF EMBODIMENTS

Exemplary embodiments of the present disclosure are described below. The present disclosure is not limited to the embodiments below.

The inventors have performed intensive investigations for the purpose of obtaining a high-strength steel sheet having high yield ratio, excellent stretch flange formability, and resistance to secondary working embrittlement. As a result, the inventors have clarified that such a high-strength steel sheet having high yield ratio, excellent stretch flange formability, and resistance to secondary working embrittlement is obtained in such a manner that the content of Nb in a composition is controlled to be 0.003% to less than 0.070% on a mass basis, a primary phase in the microstructure of steel is controlled to be ferrite, the average grain size of the ferrite controlled to be 15.0 μm or less in a cross section perpendicular to a rolling width direction, and the average aspect ratio given by the ratio of the average grain length of ferrite grains in a rolling direction to the average grain length thereof in a through-thickness direction is controlled to be 1.2 or more.

As a result of intensively investigating manufacturing conditions for obtaining the above ferrite-dominated steel microstructure, the inventors have clarified that it is important that the rate of heating to 550° C. during annealing is 120° C./h or less and soaking is held at 550° C. to 750° C. This is probably because reducing the heating rate during annealing allows the recrystallization of ferrite to occur at relatively low temperature and therefore allows the nucleation of recrystallization to be fine and adjusting the soaking temperature to relatively low temperature causes anisotropy in the growth direction of ferrite grains by the pinning effect of NbC.

The inventors have found that adjusting the concentration of hydrogen in an atmosphere during box annealing to 5% or more by volume is important in ensuring chemical conversion treatability intended by the present disclosure. This is probably because although the presence of oxides of Fe, Mn, Si, Cr, and the like on a surface of a steel sheet allows a micro-region (hereinafter also referred to as a lack of hiding) free from phosphates to be formed during a chemical conversion treatment to deteriorate the chemical conversion treatability, controlling the atmosphere in a furnace to be non-oxidizing enables the amounts of oxides on the steel sheet surface to be reduced.

The yield strength and the tensile strength have been determined by a tensile test according to JIS Z 2241 using JIS No. 5 tensile specimens which are taken such that a tensile direction is perpendicular to the rolling direction. The hole expansion ratio that is an indicator for the stretch flange formability has been determined by a hole-expanding test described in JIS Z 2256. The brittle transition temperature that is an indicator for resistance to secondary working embrittlement has been determined in such a manner that the lowest temperature (transition temperature) causing no longitudinal splitting is measured using a cylindrical deep-drawing molded article, formed at a drawing ratio of 1.8 by deep drawing and having a diameter of 50 mm and a height of 35 mm as shown in FIG. 1. When the brittle transition temperature is −60° C., which is the temperature applicable to use in cold climates, properties have been judged to be good.

The chemical conversion treatability has been evaluated by performing a chemical conversion treatment in such a manner that a sample is degreased at a treatment temperature of 40° C. for a treatment time of 120 seconds by a spraying method using a degreasing solution, FINECLEANER 2000® (the main component of which is a biodegradable surfactant free of nitrogen and phosphorus), produced by Nihon Parkerizing Co., Ltd.; is water-washed; is surface-modified at 25° C. for 20 s using a surface modifier, PREPALENE X® (the main component of which is a solution of zinc phosphate), produced by Nihon Parkerizing Co., Ltd.; is immersed in a 40° C. chemical conversion solution (PB-SX35®, the main component of which is a solution of zinc phosphate) for 120 s; is water-washed; and is then dried with warm air. The term "chemical conversion treatment" as used herein refers to treatment according to this method. Next, five fields of view of the sample subjected to the chemical conversion treatment were observed with a scanning electron microscope at 500× magnification at random. The area fraction of a lack of hiding in a chemical conversion coating was measured by a point-counting method described in ASTM E 562-05. One in which the area fraction of a lack of hiding was 5% or less was judged to be good in chemical conversion treatability.

A high-strength steel sheet, completed on the basis of the above findings, according to the present disclosure has high yield ratio, excellent stretch flange formability, resistance to secondary working embrittlement, and chemical conversion treatability required for applications for automotive inner panels.

(High-Strength Steel Sheet)

A high-strength steel sheet according to the present disclosure has a specific composition and a specific microstructure. First, the composition and the specific microstructure are described in that order.

The composition of the high-strength steel sheet according to the present disclosure contains C: 0.02% to less than 0.10%, Si: less than 0.3%, Mn: less than 1.0%, P: 0.10% or less, S: 0.020% or less, Al: 0.01% to 0.10%, N: 0.010% or less, and Nb: 0.003% to less than 0.070% on a mass basis. In this specification, the term "% on a mass basis" used to express the content of each component is referred to as "%".

C: 0.02% to Less than 0.10%

C combines with Nb to precipitate NbC, thereby increasing the yield strength and the tensile strength. When the content of C is less than 0.02%, the amount of precipitated NbC is insufficient; hence, none of desired yield strength and tensile strength is obtained. When the content of C is 0.10% or more, cementite is coarsened or pearlite or martensite is excessively produced; hence, the yield ratio or the stretch flange formability is reduced. Therefore, the content of C is set to 0.02% to less than 0.10%. The lower limit of the content of C is preferably 0.02% or more. The upper limit of the content of C is preferably 0.06% or less.

Si: Less than 0.3%

Si, which is generally effective in increasing the yield strength and the tensile strength by the solid solution strengthening of ferrite, has the effect of discharging C in ferrite grains to grain boundaries. Therefore, containing Si forms coarse cementite at the grain boundaries to deteriorate the stretch flange formability. Furthermore, Si forms an oxide in a surface layer of a steel sheet during annealing to cause the deterioration of the chemical conversion treatability. Therefore, the content of Si is preferably minimized. The upper limit thereof is set to less than 0.3% and is preferably less than 0.1%. However, adjusting the content of Si to less than 0.001% requires a lot of capital investment and long-time smelting. Therefore, the lower limit of the content of Si is preferably 0.001% or more.

Mn: Less than 1.0%

Mn is effective in increasing the yield strength and the tensile strength by the solid solution strengthening of ferrite. Mn is likely to form a solid solution in cementite, reduces the coarsening of cementite by forming the solid solution, and therefore is effective in obtaining excellent stretch flange formability. However, when the content of Mn is 1.0% or more, martensite is locally produced in manganese-segregated zones and therefore the stretch flange formability is deteriorated. Since Mn oxides are acid-soluble in terms of chemical conversion treatability, the oxides, which are formed in the surface layer of the steel sheet during annealing, are removed from the surface layer of the steel sheet when a chemical conversion treatment is performed. Therefore, the Mn oxides have no negative influence on the chemical conversion treatability in many cases. However, in the case where the Mn oxides are excessively produced, the Mn oxides cannot be completely removed from the surface layer and the deterioration of the chemical conversion treatability is caused in some cases. Therefore, the amount of added Mn is preferably small. Thus, the content of Mn is set to less than 1.0%. The lower limit of the content of Mn is preferably 0.02% or more. The upper limit of the content of Mn is preferably 0.8% or less.

P: 0.10% or Less

P segregates at ferrite grain boundaries to deteriorate resistance to secondary working embrittlement. Furthermore, P segregates in a band pattern and therefore deteriorates the stretch flange formability. Therefore, the content of P is preferably minimized. The upper limit thereof is set to 0.10%. The upper limit thereof is preferably 0.04% or less and more preferably 0.03% or less. Although no P is preferably added, the content of P is preferably 0.001% or more from the viewpoint of manufacturing costs.

S: 0.020% or Less

S is an element that is not willingly added but is inevitably contained in the form of an impurity in some cases. Since the stretch flange formability is reduced by forming inclusions of MnS and the like, the content of S is preferably minimized. Therefore, the content of S is set to 0.020% or less and is preferably 0.015% or less. Although no S is preferably added, the content of S is preferably 0.0001% or more from the viewpoint of manufacturing costs.

Al: 0.01% to 0.10%

Al is added in a smelting step for deoxidation purposes and for the purpose of fixing solute N in the form of AlN. In order to obtain a sufficient effect, the content of Al needs to be 0.01% or more. However, when the content of Al is more than 0.10%, AlN is coarsely precipitated to serve as the origin of cracking and therefore the stretch flange formability is deteriorated. Furthermore, when the content of Al is more than 0.10%, oxides are formed in the surface layer of the steel sheet during annealing to deteriorate the chemical conversion treatability. Thus, the content of Al is set to 0.01% to 0.10%. The upper limit of the content of Al is preferably 0.07% or less and more preferably 0.06% or less.

N: 0.010% or Less

N is an element that is inevitably contained until a step of refining hot-metal. When the content of N is more than 0.010%, N is precipitated in the form of Nb carbonitrides during casting. The Nb carbonitrides are coarsened and remain without being melted by slab heating and serve as the origin of cracking to deteriorate the stretch flange formability. Thus, the content of N is set to 0.010% or less. Although no N is preferably added, the content of N is preferably 0.0001% or more from the viewpoint of manufacturing costs.

Nb: 0.003% to Less than 0.070%

Nb is an important element that contributes to the increase of the yield ratio and the tensile strength by the refinement of ferrite grains and the precipitation of Nb carbonites. Containing an appropriate amount of Nb leads to the refinement of the ferrite grains and therefore is effective from the viewpoint of improving resistance to secondary working embrittlement. When the content of Nb is less than 0.003%, the volume fraction of the Nb carbonites is not sufficiently obtained and therefore the above effect due to Nb is small. When the content of Nb is 0.070% or more, the Nb carbonites are excessively precipitated and unrecrystallized ferrite which is poor in ductility remains after annealing to deteriorate the stretch flange formability. Furthermore, when the content of Nb is 0.070% or more, Nb forms oxides in the surface layer of the steel sheet during annealing to cause the deterioration of the chemical conversion treatability in some cases. Therefore, the content of Nb is set to 0.003% to less than 0.070%. The lower limit of the content of Nb is preferably 0.003% or more. The upper limit of the content of Nb is preferably 0.050% or less.

The composition of the high-strength steel sheet according to the present disclosure may contain one or more of Cr: less than 0.5%, Mo: 0.3% or less, B: 0.005% or less, Cu: 0.3% or less, and Ni: 0.3% or less on a mass basis in addition to the above components. These components are described below.

Cr: Less than 0.5%

Cr may be contained in the form of a trace element not impairing effects of the present disclosure. However, in the case of setting the soaking temperature to a high level, when the content of Cr is 0.5% or more, martensite is excessively produced by the increase of the hardenability to cause the reduction of the yield ratio in some cases. Furthermore, when the content of Cr is 0.5% or more, oxides are formed in the surface layer of the steel sheet during annealing to cause the deterioration of the chemical conversion treatability. Thus, when Cr is contained, the content thereof is set to less than 0.5%. From the viewpoint of chemical conversion treatability, the content thereof is preferably set to less than 0.3%, more preferably 0.2% or less, and most preferably 0.1% or less.

Mo: 0.3% or Less

Mo may be contained in the form of a trace element not impairing effects of the present disclosure. However, in the case of setting the soaking temperature to a high level, when the content of Mo is more than 0.3%, martensite is excessively produced by the increase of the hardenability to cause the reduction of the yield ratio in some cases. Furthermore, when the content of Mo is more than 0.3%, the rate of forming chemical conversion crystals is reduced, thereby causing the deterioration of the chemical conversion treatability. Thus, when Mo is contained, the content thereof is set to 0.3% or less. From the viewpoint of chemical conversion treatability, the content thereof is preferably set to 0.2% or less.

B: 0.005% or Less

B may be contained in the form of a trace element not impairing effects of the present disclosure. Containing B strengthens ferrite grain boundaries to further increase resistance to secondary working embrittlement in some cases. In order to obtain this effect, the content of B is preferably 3 ppm by mass or more. However, when the content of B is more than 0.005%, martensite is excessively produced by the increase of the hardenability to cause the reduction of the yield ratio in some cases. Thus, when B is contained, the content thereof is set to 0.005% or less.

Cu: 0.3% or Less

Cu may be contained in the form of a trace element not impairing effects of the present disclosure. However, when the content of Cu is more than 0.3%, martensite is excessively produced by the increase of the hardenability to cause the reduction of the yield ratio in some cases. Furthermore, when the content of Cu is more than 0.3%, the chemical conversion treatability may possibly be deteriorated in the case where oxides are formed in the surface layer of the steel sheet during annealing. Thus, when Cu is contained, the content thereof is set to 0.3% or less.

Ni: 0.3% or Less

Ni may be contained in the form of a trace element not impairing effects of the present disclosure. However, when the content of Ni is more than 0.3%, martensite is excessively produced by the increase of the hardenability to cause the reduction of the yield ratio in some cases. Furthermore, when the content of Ni is more than 0.3%, the chemical conversion treatability may possibly be deteriorated in the case where oxides are formed in the surface layer of the steel sheet during annealing. Thus, when Ni is contained, the content thereof is set to 0.3% or less.

The remainder other than the above are Fe and inevitable impurities. The inevitable impurities include not only components inevitably contained during manufacturing but also components which are inevitably added for the purpose of obtaining desired properties and the like and which do not impair effects of the present disclosure. The inevitable impurities include, for example, one or more of Mg, Ca, Sr, Sn, Sb, Bi, Ta, and W which total 1% or less.

Subsequently, the steel microstructure of the high-strength steel sheet according to the present disclosure is described. The high-strength steel sheet according to the present disclosure has a steel microstructure which contains ferrite: 90% or more and a total of pearlite, martensite, retained austenite, and cementite: 0% to 10% on an area fraction basis, in which the average grain size of ferrite is 15.0 m or less, and in which the average aspect ratio of ferrite is 1.2 or more. The microstructures of the high-strength steel sheet of the present disclosure are described below.

Ferrite: 90% or More

Ferrite has good ductility. In the present disclosure, in order to satisfy all of high yield ratio, excellent stretch flange formability, and excellent resistance to secondary working embrittlement intended by the present disclosure, it is necessary that ferrite is a primary phase and 90% or more ferrite is contained on an area fraction basis. When the content of ferrite is less than 90%, the above properties intended by the present disclosure are not obtained. Thus, ferrite is set to 90% or more and is preferably 95% or more on an area fraction basis.

Total of Pearlite, Martensite, Retained Austenite, and Cementite: 0% to 10%

Containing one or more of pearlite, martensite, retained austenite, and cementite further increases the tensile strength and the yield ratio. When 0% to 10% of these are contained in total on an area fraction basis, the properties intended by the present disclosure can be obtained. However, when the total of pearlite, martensite, retained austenite, and cementite is more than 10% on an area fraction basis, the stretch flange formability and resistance to secondary working embrittlement are deteriorated. Therefore, the total of pearlite, martensite, retained austenite, and cementite is set to 0% to 10% and is preferably 0% to 5% on an area fraction basis. Incidentally, even when the area fraction of ferrite is 100%, a desired strength can be obtained. The sum of the area fractions of the above microstructures may be 0%.

Average Grain Size of Ferrite: 15.0 µm or Less

The average grain size of ferrite is important in obtaining excellent resistance to secondary working embrittlement and a high yield ratio of 0.70 or more as intended by the present disclosure. However, when the average grain size of ferrite is more than 15.0 µm, a yield ratio of 0.70 or more is not obtained and resistance to secondary working embrittlement is deteriorated. Therefore, the average grain size of ferrite is set to 15.0 µm or less and is preferably 10.0 m or less. When the average grain size of ferrite is less than 5 µm, the yield ratio and the tensile strength are excessively increased or the formability is deteriorated. Therefore, the average grain size thereof is preferably 5 µm or more.

Average Aspect Ratio of Ferrite: 1.2 or More

The average aspect ratio of ferrite is important in obtaining excellent stretch flange formability and resistance to secondary working embrittlement. Although a detailed reason is unclear, it is conceivable that in a hole-expanding test in which forming is perform until a crack pierces in a through-thickness direction, when the grain length in the through-thickness direction is less than the grain length in the rolling direction, the number of grain boundaries hindering the progress of cracking increases to enhance the stretch flange formability in the case where the average grain sizes are equal. When the average aspect ratio of ferrite is less than 1.2, this effect is small. Therefore, the average aspect ratio of ferrite is set to 1.2 or more and is preferably 1.4 or more.

Increasing the average aspect ratio of ferrite saturates this effect and therefore the average aspect ratio of ferrite may be 10.0 or less. Incidentally, in the present disclosure, ferrite is recrystallized ferrite.

The area fraction of each microstructure can be determined by the point-counting method described in ASTM E 562-05 in such a manner that in a cross section perpendicular to the rolling width direction, a thickness one-fourth position from a surface of the steel sheet is observed with a SEM. The average grain size of ferrite can be determined in such a manner that the thickness one-fourth position from the steel sheet surface is observed with an optical microscope and the equivalent circle diameter is calculated from the area of observation and the number of grains. The average aspect ratio of ferrite can be determined by the formula (average grain length in rolling direction)/(average grain length in through-thickness direction) in such a manner that in the cross section perpendicular to the rolling width direction, the thickness one-fourth position from the steel sheet surface is observed with an optical microscope and the average grain length in the rolling direction and the average grain length in the through-thickness direction are calculated by a method for determining the average line segment length per crystal grain as shown in Table 1 of JIS G 0551.

A high-strength steel sheet having the above composition and steel microstructure is the high-strength steel sheet according to the present disclosure. The high-strength steel sheet according to the present disclosure may have a galvanized coating or an electrogalvanized coating on a surface thereof. The galvanized coating may be a galvannealed coating.

Subsequently, a method for manufacturing the high-strength steel sheet according to the present disclosure is described. The high-strength steel sheet according to the present disclosure can be manufactured by annealing a cold-rolled steel sheet in a box annealing furnace. The cold-rolled steel sheet is annealed in such a manner that the concentration of hydrogen in the atmosphere in the furnace is set to 5% to 100% and the cold-rolled steel sheet is heated to 550° C. at 120° C./h or less and is soaked in a temperature range from 550° C. to 750° C. The cold-rolled steel sheet is manufactured in such a manner that a slab is prepared by continuous casting, is hot-rolled, is pickled, and is cold-rolled. Manufacturing conditions are described below.

A casting process is not particularly limited and may be an ingot-casting process or a continuous casting process if the segregation of components or significant structural unevenness does not occur.

For hot rolling, the high-temperature cast slab may be directly rolled or the slab cooled to room temperature may be rolled after being reheated. When the slab has surface defects such as cracks, the slab can be tended with a grinder or the like. In the case of reheating the slab, the slab is preferably heated to 1,100° C. or higher for the purpose of melting Nb carbonitrides. In hot rolling, the high-temperature slab is roughly rolled and is finish-rolled into a hot-rolled steel sheet, which is coiled into hot-rolled coil.

Rough rolling conditions and finish rolling conditions are not particularly limited and may be determined in accordance with common practice. When the finish rolling temperature is lower than the Ar3 temperature, coarse ferrite extending in the rolling direction is produced as a hot-rolled steel sheet microstructure to cause a reduction in ductility in some cases. Therefore, the finish rolling temperature is preferably higher than or equal to the Ar3 temperature. In the case of using a thin slab, rough rolling may be omitted. The term "thin slab" refers to a slab having a thickness of 200 mm or less.

The coiling temperature is not particularly limited and may be determined in accordance with common practice. From the viewpoint of obtaining high yield ratio intended by the present disclosure, the coiling temperature is preferably 500° C. to 700° C. for the purpose of appropriately controlling the precipitation amounts of Nb carbides and the size of precipitates. In the case where the chemical conversion treatability needs to be further enhanced, the coiling temperature is preferably 650° C. or lower. The lower limit thereof is most preferably 550° C. or higher.

The upper limit of the coiling temperature is most preferably 650° C. or lower.

Cold rolling may be performed in accordance with common practice. The rolling reduction is preferably 30% to 90%. The reason why the rolling reduction is preferably 30% or more is because ferrite is completely recrystallized during box annealing and excellent stretch flange formability is obtained. The reason why the rolling reduction is preferably 90% or less is because no shape failures are caused. From the viewpoint of productivity impairment due to the reduction in anisotropy of tensile properties and the increase of rolling load, the rolling reduction is more preferably 75% or less.

In annealing, the cold-rolled steel sheet is heated, soaked, and cooled using the box annealing furnace. The box annealing furnace has lower facility installation costs as compared to continuous annealing furnaces. Therefore, it is useful that the above-mentioned properties (desired tensile strength, yield ratio, stretch flange formability, resistance to secondary working embrittlement, and chemical conversion treatability) are obtained using the box annealing furnace.

Concentration of Hydrogen in Atmosphere in Box Annealing Furnace: 5% to 100% by Volume The concentration of hydrogen in the atmosphere in the box annealing furnace is a manufacturing condition important in obtaining excellent chemical conversion treatability intended by the present disclosure. In a site where oxides of Si, Mn, and the like are formed on the steel sheet surface, no chemical conversion crystals are formed and therefore a lack of hiding is caused. When the concentration of hydrogen is less than 5% by volume, oxides are formed in the surface layer of the steel sheet and therefore the chemical conversion treatability is deteriorated. Furthermore, when the concentration of hydrogen is less than 5% by volume, scales are formed to cause the deterioration of appearances such as a tempering color. In the case where a steel sheet having oxides on a surface thereof is used as a base steel sheet and is plated, an unplated spot not covered by any coating is caused in a site where the oxides are formed. Even in a plated steel sheet, such a site leads to a lack of hiding during a chemical conversion treatment and therefore the chemical conversion treatability is inferior. Therefore, the concentration of hydrogen in the atmosphere in the furnace needs to be 5% by volume or more. In order to completely suppress the formation of oxides in the surface layer of the steel sheet, the concentration of hydrogen in the atmosphere in the furnace is preferably 10% by volume or more. In order to completely suppress the formation of the oxides in the surface layer of the steel sheet, the concentration of hydrogen in the atmosphere in the furnace is more preferably 50% by volume or more. Furthermore, in order to completely suppress the formation of the oxides in the surface layer of the steel sheet, the concentration of hydrogen in the atmosphere in the furnace is more preferably 90% by volume or more. The upper limit thereof is 100% by volume. The remainder is preferably an inert gas, which may be nitrogen ($N_2$), argon (Ar), or the like. The atmosphere in the furnace may contain carbon monoxide (CO), carbon dioxide ($CO_2$), and the like.

Rate of Heating to 550° C. being 120° C./h or Less

In the heating of the cold-rolled steel sheet, the average rate of heating from room temperature to 550° C. is a manufacturing condition important in obtaining desired fine ferrite grains extending in the rolling direction after annealing. When the rate of heating to 550° C. is more than 120° C./h, the average aspect ratio of the ferrite grains falls below 1.2 and therefore the stretch flange formability and resistance to secondary working embrittlement are deteriorated. Therefore, the rate of heating to 550° C. is set to 120° C./h or less and is preferably 100° C./h or less.

The heating rate lacks a lower limit from reasons of properties of the steel sheet and is preferably 10° C./h or more from the viewpoint of productivity. In the case of heating to a temperature of 550° C. or higher, the average heating rate in a range of not lower than 550° C. is not particularly limited and may be 120° C./h or less or more than 120° C./h.

Soaking temperature: 550° C. to 750° C.

The soaking temperature is a requirement important in controlling the size of the ferrite grains. When the soaking temperature is lower than 550° C., the recrystallization of ferrite becomes insufficient and the stretch flange formability is deteriorated. When the soaking temperature is higher than 750° C., the ferrite grains and Nb carbides are coarsened and therefore the tensile strength, high yield ratio, excellent stretch flange formability and resistance to secondary working embrittlement intended by the present disclosure are not obtained. Therefore, the soaking temperature is set to 550° C. to 750° C. The lower limit of the soaking temperature is preferably 600° C. or higher. The upper limit of the soaking temperature is preferably 700° C. or lower. The soaking time is not particularly limited, is preferably 1 hour or more for the purpose of completely recrystallizing ferrite, and is preferably 60 hours or less for the purpose of suppressing the excessive coarsening of the ferrite grains. The soaking time is the time for which the soaking temperature is within the above temperature range (550° C. to 750° C., preferably 600° C. to 700° C.) and holding at constant temperature is not needed. Incidentally, from the viewpoint of chemical conversion treatability, the soaking temperature is preferably low in order to suppress the formation of oxides in the surface layer of the steel sheet.

After the above soaking, the cold-rolled steel sheet is cooled. Cooling conditions are not particularly limited and may be determined in accordance with common practice.

After the above annealing, a coating may be formed on a surface of the high-strength steel sheet. The coating may be, for example, an electrogalvanized coating or a galvanized coating. The galvanized coating is preferably a galvannealed coating.

The high-strength steel sheet or the high-strength steel sheet having the coating may be temper-rolled at an elongation of 0.1% to 5.0% as required.

The high-strength steel sheet, which is intended by the present disclosure, is obtained as described above. Even if the high-strength steel sheet is subjected to a surface treatment such as an organic coating treatment, properties intended by the present disclosure are not impaired.

EXAMPLES

The present disclosure is further described below in detail with reference to examples.

After slabs of Steels A to P having a composition shown in Table 1 were soaked at 1,250° C. for 1 hour, hot-rolled steel sheets were prepared therefrom at a finish rolling temperature of 900° C., which is higher than or equal to the Ar3 temperature, so as to have a finish thickness of 3.2 mm. After being cooled, the hot-rolled steel sheets were coiled at a coiling temperature of 580° C. After being pickled, the manufactured hot-rolled steel sheets were cold-rolled into cold-rolled steel sheets with a finish thickness of 1.4 mm (a rolling reduction of 56%). The cold-rolled steel sheets were annealed in a box annealing furnace (however, No. 24 was annealed in a continuous annealing furnace) under conditions shown in Table 2, whereby High-strength Steel Sheet Nos. 1 to 24 were manufactured. The concentration of hydrogen in the furnace was 100% by volume (however, for No. 17, the concentration of hydrogen therein was 4% and for No. 24, the concentration of hydrogen therein was 10%).

Some of the high-strength steel sheets were electrogalvanized, galvanized, or galvannealed. Those electrogalvanized had a coating weight of 3 g/m². Those to be galvanized were galvanized so as to have a coating weight of 45 g/m² in such a manner that those were soaked at 650° C. for 30 seconds and were then immersed in a hot-dip galvanizing bath, followed by cooling. Those to be galvannealed were immersed in the hot-dip galvanizing bath and were then alloyed by holding those at 510° C. for 10 seconds. In Table 2, galvanized steel sheets are denoted as GI, galvannealed steel sheets are denoted as GA, and electrogalvanized steel sheets are denoted as EG.

The obtained high-strength steel sheets were observed for steel microstructure, were subjected to tensile testing, and were measured for hole expansion ratio (k), brittle transition temperature, and chemical conversion treatability.

The area fraction of each microstructure was determined by a point-counting method described in ASTM E 562-05 in such a manner that in a cross section perpendicular to a rolling width direction, a thickness one-fourth position from a surface of each steel sheet was magnified 1,000 times with a SEM. The average grain size of ferrite was determined in such a manner that the thickness one-fourth position was magnified 400 times with an optical microscope and the equivalent circle diameter was determined from the area of observation and the number of grains. The area fraction of each microstructure and the average grain size of ferrite were the arithmetic average of 10 fields of view.

The average aspect ratio of ferrite was determined by the formula (average grain length in rolling direction)/(average grain length in through-thickness direction) in such a manner that in the cross section perpendicular to the rolling width direction, the thickness one-fourth position from the steel sheet surface was observed with an optical microscope at 400× magnification and the average grain length in the rolling direction and the average grain length in the through-thickness direction were calculated, with the total line segment length being 20 mm, by a method for determining the average line segment length per grain as shown in Table 1 of JIS G 0551. Results were shown in Table 2. In Table 2, α represents ferrite, P represents pearlite, M represents martensite, γ represents retained austenite, and θ represents cementite.

The tensile strength (TS) and the yield ratio (YR) were determined by a tensile test according to JIS Z 2241 using JIS No. 5 tensile specimens which were taken such that a tensile direction was perpendicular to the rolling direction. Results were shown in Table 2. A tensile strength of 300 MPa to 500 MPa was rated good. A yield ratio of 0.70 or more was rated good.

The stretch flange formability was evaluated by a hole-expanding test according to JIS Z 2256. Results were shown in Table 2. A hole expansion ratio (k) of 100% or more was rated good.

Resistance to secondary working embrittlement was evaluated from the brittle transition temperature. As shown in FIG. 1, the lowest temperature (transition temperature) causing no longitudinal splitting was measured using a cylindrical deep-drawing molded article, formed at a drawing ratio of 1.8 by deep drawing, having a diameter of 50 mm and a height of 35 mm. When the transition temperature was −60° C., properties were judged to be good. The temperature T of a coolant was varied in increments of 10° C.

The chemical conversion treatability was evaluated in such a manner that a chemical conversion treatment was performed by the above-mentioned method and the area fraction of a lack of hiding was measured by the above-mentioned method using a SEM. Those in which the area fraction of a lack of hiding was 5% or less were judged to have excellent chemical conversion treatability intended by the present disclosure. The area fraction of a lack of hiding was shown in Table 2.

TABLE 1

| | Mass percent | | | | | | | | |
|---|---|---|---|---|---|---|---|---|---|
| Steel | C | Si | Mn | P | S | Al | N | Nb | Others | Categories |
| A | 0.05 | 0.01 | 0.4 | 0.02 | 0.002 | 0.03 | 0.003 | 0.012 | | Inventive example |
| B | 0.02 | 0.02 | 0.5 | 0.02 | 0.001 | 0.03 | 0.003 | 0.011 | | Inventive example |
| C | 0.08 | 0.01 | 0.3 | 0.02 | 0.002 | 0.02 | 0.002 | 0.009 | | Inventive example |
| D | 0.01 | 0.01 | 0.4 | 0.02 | 0.002 | 0.03 | 0.004 | 0.008 | | Comparative example |
| E | 0.12 | 0.03 | 0.7 | 0.01 | 0.003 | 0.04 | 0.003 | 0.011 | | Comparative example |
| F | 0.04 | 0.01 | 0.8 | 0.02 | 0.002 | 0.03 | 0.003 | 0.013 | | Inventive example |
| G | 0.09 | 0.02 | 1.5 | 0.01 | 0.002 | 0.02 | 0.002 | 0.011 | | Comparative example |
| H | 0.04 | 0.01 | 0.6 | 0.04 | 0.001 | 0.02 | 0.003 | 0.012 | | Inventive example |
| I | 0.04 | 0.01 | 0.5 | 0.02 | 0.003 | 0.03 | 0.004 | 0.007 | | Inventive example |
| J | 0.04 | 0.01 | 0.6 | 0.02 | 0.002 | 0.04 | 0.003 | 0.038 | | Inventive example |
| K | 0.05 | 0.02 | 0.5 | 0.02 | 0.002 | 0.02 | 0.004 | 0.002 | | Comparative example |
| L | 0.03 | 0.01 | 0.4 | 0.02 | 0.001 | 0.02 | 0.003 | 0.095 | | Comparative example |
| M | 0.08 | 0.02 | 0.3 | 0.01 | 0.002 | 0.03 | 0.003 | 0.015 | Cr: 0.1, Ni: 0.2, B: 0.0011 | Inventive example |
| N | 0.07 | 0.02 | 0.5 | 0.03 | 0.002 | 0.02 | 0.003 | 0.013 | Cu: 0.1, Mo: 0.1 | Inventive example |
| O | 0.03 | 0.02 | 0.4 | 0.02 | 0.002 | 0.03 | 0.003 | 0.011 | Cr:0.5 | Comparative example |
| P | 0.04 | 0.01 | 0.3 | 0.02 | 0.002 | 0.03 | 0.003 | 0.009 | Mo:0.5 | Comparative example |

TABLE 2

| No. | Steel | Annealing | | | | | Steel microstructure | | | |
|---|---|---|---|---|---|---|---|---|---|---|
| | | Hydrogen concentration (%) | Heating rate (° C./h) | Soaking temperature (° C.) | Soaking Time (h) | Type of coating | α (%) | P + M + γ + θ(%) | α grain size (μm) | Aspect ratio |
| 1 | A | 100 | 20 | 680 | 16 | No coating | 98 | θ: 2 | 11.0 | 1.7 |
| 2 | B | 100 | 20 | 650 | 19 | No coating | 99 | θ: 1 | 9.6 | 1.5 |
| 3 | C | 100 | 18 | 680 | 2 | No coating | 97 | θ: 3 | 11.3 | 1.5 |
| <u>4</u> | <u>D</u> | 100 | 20 | 720 | 19 | No coating | 100 | 0 | 13.7 | 1.4 |
| <u>5</u> | <u>E</u> | 100 | 25 | 740 | 25 | No coating | 89 | <u>M:11</u> | 14.8 | 1.4 |
| 6 | F | 100 | 20 | 660 | 15 | GI | 99 | θ: 1 | 10.4 | 1.4 |
| <u>7</u> | <u>G</u> | 100 | 28 | 740 | 15 | No coating | 94 | M: 6 | 13.0 | 1.4 |
| 8 | H | 100 | 26 | 670 | 20 | No coating | 99 | θ: 1 | 10.1 | 1.5 |
| 9 | I | 100 | 30 | 660 | 20 | GI | 99 | θ: 1 | 10.0 | 1.6 |
| 10 | J | 100 | 19 | 680 | 24 | GA | 99 | θ: 1 | 9.2 | 2.1 |
| <u>11</u> | <u>K</u> | 100 | 20 | 670 | 24 | EG | 98 | θ: 2 | <u>16.4</u> | 1.6 |
| <u>12</u> | <u>L</u> | 100 | 20 | 620 | 3 | EG | 99* | θ: 1 | * | * |
| 13 | M | 100 | 25 | 640 | 16 | GI | 98 | θ: 2 | 9.9 | 1.5 |
| 14 | N | 100 | 30 | 670 | 25 | No coating | 98 | θ: 2 | 10.8 | 1.6 |
| <u>15</u> | <u>O</u> | 100 | 25 | 650 | 20 | No coating | 98 | θ: 2 | 9.3 | 1.6 |
| <u>16</u> | <u>P</u> | 100 | 23 | 640 | 20 | No coating | 98 | θ: 2 | 9.7 | 1.5 |
| <u>17</u> | A | <u>4</u> | 20 | 670 | 20 | No coating | 98 | θ: 2 | 10.2 | 1.7 |
| 18 | A | 100 | 100 | 680 | 16 | No coating | 98 | θ: 2 | 14.2 | 1.9 |
| <u>19</u> | A | 100 | <u>300</u> | 650 | 20 | No coating | 98 | θ: 2 | <u>17.3</u> | <u>1.1</u> |
| 20 | A | 100 | 25 | 610 | 20 | No coating | 98 | θ: 2 | 9.2 | 1.5 |
| 21 | A | 100 | 26 | 750 | 17 | No coating | 98 | P: 2 | 12.7 | 1.4 |
| <u>22</u> | A | 100 | 30 | <u>500</u> | 18 | No coating | 98* | θ: 2 | * | * |
| <u>23</u> | A | 100 | 27 | 650 | 30 | No coating | 98 | θ: 2 | <u>20.5</u> | 1.4 |
| <u>24</u> | A | 10 | <u>300</u> | 650 | <u>0.025</u> | No coating | 98* | θ: 2 | * | * |

| No. | Properties | | | | | |
|---|---|---|---|---|---|---|
| | TS (MPa) | YR | λ(%) | Transition temperature (° C.) | Chemical conversion treatability | Categories |
| 1 | 407 | 0.76 | 126 | −110 | 1 | Inventive example |
| 2 | 376 | 0.74 | 131 | −120 | 1 | Inventive example |
| 3 | 401 | 0.77 | 105 | −110 | 0 | Inventive example |
| <u>4</u> | 327 | <u>0.64</u> | 149 | −140 | 0 | Comparative example |
| <u>5</u> | <u>544</u> | <u>0.59</u> | <u>85</u> | −80 | 1 | Comparative example |
| 6 | 399 | 0.75 | 118 | −110 | 2 | Inventive example |
| <u>7</u> | 435 | 0.71 | <u>82</u> | −100 | 3 | Comparative example |
| 8 | 385 | 0.73 | 114 | −80 | 2 | Inventive example |
| 9 | 362 | 0.71 | 143 | −120 | 1 | Inventive example |
| 10 | 436 | 0.82 | 108 | −110 | 0 | Inventive example |
| <u>11</u> | 322 | <u>0.65</u> | 135 | −130 | 1 | Comparative example |
| <u>12</u> | <u>677</u> | 0.92 | <u>56</u> | <u>0</u> | 0 | Comparative example |
| 13 | 399 | 0.74 | 131 | −120 | 3 | Inventive example |
| 14 | 397 | 0.75 | 119 | −90 | 3 | Inventive example |
| <u>15</u> | 388 | 0.74 | 120 | −90 | <u>11</u> | Comparative example |
| <u>16</u> | 379 | 0.74 | 125 | −100 | <u>13</u> | Comparative example |
| <u>17</u> | 340 | 0.75 | 115 | −100 | <u>9</u> | Comparative example |
| 18 | 388 | 0.73 | 115 | −100 | 0 | Inventive example |
| <u>19</u> | 366 | <u>0.68</u> | <u>91</u> | <u>−50</u> | 1 | Comparative example |
| 20 | 424 | 0.83 | 126 | −110 | 0 | Inventive example |
| 21 | 442 | 0.81 | 125 | −110 | 2 | Inventive example |
| <u>22</u> | <u>691</u> | 0.83 | <u>65</u> | <u>−10</u> | 0 | Comparative example |
| <u>23</u> | 287 | <u>0.67</u> | 127 | <u>−50</u> | 4 | Comparative example |
| <u>24</u> | <u>522</u> | 0.78 | <u>80</u> | <u>−30</u> | 0 | Comparative example |

*The whole is unrecrystailized ferrite and the α grain size and the aspect ratio are unmeasurable.
- Underlines show items that are outside the scope of the present disclosure or properties that are not good.

Table 2 shows results of the observation of each steel microstructure, results of the tensile test, and results of chemical conversion treatability and the like. Nos. 1 to 3, 6, 8 to 10, 13, 14, 18, 20, and 21 meet all requirements of the present disclosure and therefore high-strength steel sheets, having high yield ratio, excellent in stretch flange formability, resistance to secondary working embrittlement, and chemical conversion treatability intended by the present disclosure are obtained. However, in Nos. 4, 5, 7, 11, 12, 15 to 17, 19, 22, 23, and 24, steel components or manufacturing conditions are outside the scope of the present disclosure and no desired steel microstructure nor surface condition is obtained; hence, no high-strength steel sheets, having high yield ratio, excellent in stretch flange formability, resistance to secondary working embrittlement, and chemical conversion treatability intended by the present disclosure are obtained.

INDUSTRIAL APPLICABILITY

A high-strength steel sheet is suitable for fields requiring high yield ratio, excellent stretch flange formability, resistance to secondary working embrittlement, and chemical conversion treatability.

The invention claimed is:

1. A high-strength steel sheet having a composition comprising:
C: 0.02% to less than 0.10%, by mass %,
Si: less than 0.3%, by mass %,
Mn: less than 1.0%, by mass %,
P: 0.10% or less, by mass %,
S: 0.020% or less, by mass %,
Al: 0.01% to 0.10%, by mass %,
N: 0.010% or less, by mass %,
Nb: 0.003% to less than 0.070%, by mass %, and
Fe and inevitable impurities;
wherein:
the steel sheet has a steel microstructure that contains:
ferrite: 90% or more on an area fraction basis, and
a total of pearlite, martensite, retained austenite, and cementite: 0% to 10% on an area fraction basis,
the average grain size of the ferrite is 15.0 µm or less,
the average aspect ratio of the ferrite, as defined by the formula (average grain length of the ferrite in a rolling direction of the steel sheet)/(average grain length of the ferrite in a through-thickness direction of the steel sheet), is 1.2 or more,
an amount of oxides of Fe, Mn, Si, and Cr present on a surface of the steel sheet is provided so that when the steel sheet is subjected to a chemical conversion treatment with a phosphate conversion coating, an area fraction of a micro-region on a surface of the steel sheet that is free from phosphates is 5% or less, and
the steel sheet has a tensile strength of 500 MPa or less.

2. The high-strength steel sheet according to claim 1, wherein the chemical composition further comprises one or more of:
Cr: less than 0.5%, by mass %,
Mo: 0.3% or less, by mass %,
B: 0.005% or less, by mass %,
Cu: 0.3% or less, by mass %, and
Ni: 0.3% or less, by mass %.

3. The high-strength steel sheet according to claim 2, having a galvanized layer on a surface thereof.

4. The high-strength steel sheet according to claim 3, wherein the galvanized layer is a galvannealed layer.

5. The high-strength steel sheet according to claim 2, having an electrogalvanized layer on a surface thereof.

6. The high-strength steel sheet according to claim 1, having a galvanized layer on a surface thereof.

7. The high-strength steel sheet according to claim 6, wherein the galvanized layer is a galvannealed layer.

8. The high-strength steel sheet according to claim 1, having an electrogalvanized layer on a surface thereof.

9. The high-strength steel sheet according to claim 1, wherein if the composition further comprises Cr, the Cr is included in the composition in an amount of 0.2% or less, by mass %.

10. The high-strength steel sheet according to claim 1, having a yield ratio of 0.70 or more.

11. A method for manufacturing the high-strength steel sheet according to claim 1, the method comprising:
annealing a cold-rolled steel sheet in a box annealing furnace,
wherein:
a concentration of hydrogen in the atmosphere in the furnace is 5% to 100% by volume,
during the annealing, the cold-rolled steel sheet is heated to 550° C. at 120° C./h or less, and
during the annealing, the cold-rolled steel sheet is soaked in a temperature range from 550° C. to 750° C.

12. The method for manufacturing the high-strength steel sheet according to claim 11, wherein after the annealing, galvanizing is performed.

13. The method for manufacturing the high-strength steel sheet according to claim 12, wherein after the galvanizing is performed, the galvanizing is subjected to an alloying treatment.

14. The method for manufacturing the high-strength steel sheet according to claim 11, wherein after the annealing, electro-galvanizing is performed.

15. A method for manufacturing the high-strength steel sheet according to claim 2, the method comprising:
annealing a cold-rolled steel sheet in a box annealing furnace,
wherein:
a concentration of hydrogen in the atmosphere in the furnace is 5% to 100% by volume,
during the annealing, the cold-rolled steel sheet is heated to 550° C. at 120° C./h or less, and
during the annealing, the cold-rolled steel sheet is soaked in a temperature range from 550° C. to 750° C.

16. The method for manufacturing the high-strength steel sheet according to claim 15, wherein after the annealing, galvanizing is performed.

17. The method for manufacturing the high-strength steel sheet according to claim 16, wherein after the galvanizing is performed, the galvanizing is subjected to an alloying treatment.

18. The method for manufacturing the high-strength steel sheet according to claim 15, wherein after the annealing, electro-galvanizing is performed.

19. A high-strength steel sheet having a composition comprising:
C: 0.02% to less than 0.10%, by mass %,
Si: less than 0.3%, by mass %,
Mn: less than 1.0%, by mass %,
P: 0.10% or less, by mass %,
S: 0.020% or less, by mass %,
Al: 0.01% to 0.10%, by mass %,
N: 0.010% or less, by mass %, Nb: 0.003% to less than 0.070%, by mass %, and
Fe and inevitable impurities;
wherein:
the steel sheet has a steel microstructure that contains:
   ferrite: 90% or more on an area fraction basis, and
   a total of pearlite, martensite, retained austenite, and cementite: 0% to 10% on an area fraction basis,
the average grain size of the ferrite is 15.0 μm or less,
the average aspect ratio of the ferrite, as defined by the formula (average grain length of the ferrite in a rolling direction of the steel sheet)/(average grain length of the ferrite in a through-thickness direction of the steel sheet), is 1.2 or more,
an amount of oxides of Fe, Mn, Si, and Cr present on a surface of the steel sheet is provided so that when the steel sheet is subjected to a treatment that comprises surface modifying the steel sheet with a solution of zinc phosphate at 25° C. for 20 s and then immersing the steel sheet in a solution of zinc phosphate at 40° C. for 120 s, an area fraction of a micro-region on a surface of the steel sheet that is free from phosphates is 5% or less, and
the steel sheet has a tensile strength of 500 MPa or less.

20. A high-strength steel sheet having a composition consisting of:
C: 0.02% to less than 0.10%, by mass %,
Si: less than 0.3%, by mass %,
Mn: less than 1.0%, by mass %,
P: 0.10% or less, by mass %,
S: 0.020% or less, by mass %,
Al: 0.01% to 0.10%, by mass %,
N: 0.010% or less, by mass %,
Nb: 0.003% to less than 0.070%, by mass %,
Cr: less than 0.5%, by mass %,
Mo: 0.3% or less, by mass %,
B: 0.005% or less, by mass %,
Cu: 0.3% or less, by mass %,
Ni: 0.3% or less, by mass %,
inevitable impurities selected from the group consisting of Mg, Ca, Sr, Sn, Sb, Bi, Ta, and W: 1% or less, by mass, and
Fe: balance;
wherein:
the steel sheet has a steel microstructure that contains:
   ferrite: 90% or more on an area fraction basis, and
   a total of pearlite, martensite, retained austenite, and cementite: 0% to 10% on an area fraction basis,
the average grain size of the ferrite is 15.0 μm or less,
the average aspect ratio of the ferrite, as defined by the formula (average grain length of the ferrite in a rolling direction of the steel sheet)/(average grain length of the ferrite in a through-thickness direction of the steel sheet), is 1.2 or more, and
the steel sheet has a tensile strength of 500 MPa or less.

* * * * *